United States Patent [19]
Heimann

[11] Patent Number: 5,357,146
[45] Date of Patent: Oct. 18, 1994

[54] GLITCH-FREE CLOCK MULTIPLEXER

[75] Inventor: Martin E. Heimann, Chatham, N.J.

[73] Assignee: AT&T Bell Laboratories, Murray Hill, N.J.

[21] Appl. No.: 999,416

[22] Filed: Dec. 31, 1992

[51] Int. Cl.⁵ .................. H03K 5/13; H03K 17/00
[52] U.S. Cl. .................. 307/269; 307/243; 307/510; 307/518; 328/104; 328/137; 328/154; 377/78; 377/80
[58] Field of Search ............ 307/241, 242, 243, 269, 307/272.2, 510, 517, 518; 328/63, 104, 154, 137; 377/78, 80; 331/49

[56] References Cited

U.S. PATENT DOCUMENTS

| | | | |
|---|---|---|---|
| 4,229,699 | 10/1980 | Frissell | 307/269 |
| 4,314,164 | 2/1982 | Tin et al. | 328/154 |
| 4,593,390 | 6/1986 | Hildebrand et al. | 328/137 |
| 4,644,568 | 2/1987 | Canniff et al. | 328/134 |
| 4,694,196 | 9/1987 | Hasley et al. | 307/269 |
| 4,853,653 | 8/1989 | Maher | 328/63 |
| 4,970,405 | 11/1990 | Hagiwara | 307/269 |
| 4,998,901 | 1/1991 | Kamuro et al. | 328/154 |
| 5,099,141 | 3/1992 | Utsunomiya | 307/269 |
| 5,122,677 | 6/1992 | Sato | 307/269 |
| 5,155,380 | 10/1992 | Hwang et al. | 307/269 |
| 5,254,888 | 10/1993 | Lee et al. | 307/243 |

Primary Examiner—Timothy P. Callahan
Assistant Examiner—Terry D. Cunningham
Attorney, Agent, or Firm—David L. Smith

[57] ABSTRACT

A multiplexer for selecting one of at least two input signals as the output on sensing the change in the state of a select input waits for the clock signal of the active first clock to transition to a predetermined state, disconnects the active first clock from the output of the multiplexer and maintains the output of the multiplexer in the predetermined state while waiting for the clock signal of a second clock to transition to the predetermined state. The second clock is connected as the multiplexer output while the clock signal of the second clock is in the predetermined state. In a preferred embodiment, the predetermined state is a low logic level.

5 Claims, 2 Drawing Sheets

GLITCH-FREE CLOCK MULTIPLEXER

TECHNICAL FIELD

This invention relates generally to integrated circuits having multiplexers and particularly to integrated circuits having glitch-free multiplexer switching between two clock signals.

BACKGROUND OF THE INVENTION

In some applications it is necessary to switch between two clock signals where one clock signal is provided by a first source and is used for one purpose, and the other clock signal is provided by a second source and is used for another purpose. Most specifications for providing a clock signal to integrated circuits specify a clock signal must be high for a minimum period of time and low for a minimum period of time to assure that operations initiated by each cycle of a clock signal are completed before the occurrence of a subsequent clock cycle. In switching from a first clock source to a second clock source, it is imperative that the clock signal not violate the specifications. For a clock signal to be maintained in either state, high or low, for an extended period of time, does not violate the specifications. To have a high or low portion of any clock signal cycle that is less than the specified minimum, called a glitch, is undesirable.

One such application is a disk drive read channel where it is desired to switch between two clock signals that have arbitrary frequency and phase relationships. When data is being written onto a disk, a clock signal generated by a local crystal oscillator is utilized. The disk is a spinning magnetic medium with the potential of having slight variations in the speed of rotation. When data is being read from the disk, a phase-locked loop circuit is utilized to recover a clock signal from the read data as it is being read from the disk because of the potential variations in disk speed both during the read and write operations. The read and write data is transferred to and from a controller that communicates with a computer to further process the data. This data transfer must be accomplished using a clock with the correct phase and frequency relationship to the data being transferred. In switching from reading to writing operations or from writing to reading operations, the clock switching must be glitch free or the disk drive controller might be switched to an unpredictable state.

It would be desirable to have a multiplexer that would switch from a first clock signal to a second clock signal in a manner that assures that neither the high portion nor the low portion of any clock cycle is shortened.

SUMMARY OF THE INVENTION

In accordance with an embodiment of the invention, an integrated circuit includes a multiplexer for selecting one of at least two input signals as the output. The logic level of a select input determines which input signal is provided as the output of the multiplexer. The multiplexer senses a transition in the state of the logic level of the select input then waits for the clock signal of the active first clock to transition to a predetermined state. The multiplexer then disconnects the active first clock from the output of the multiplexer and maintains the output of the multiplexer in the predetermined state while waiting for the clock signal of a second clock to transition to the predetermined state. The second clock is connected as the multiplexer output while the clock signal of the second clock is in the predetermined state. In a preferred embodiment, the predetermined state is a low logic level.

DETAILED DESCRIPTION

Figure 1:
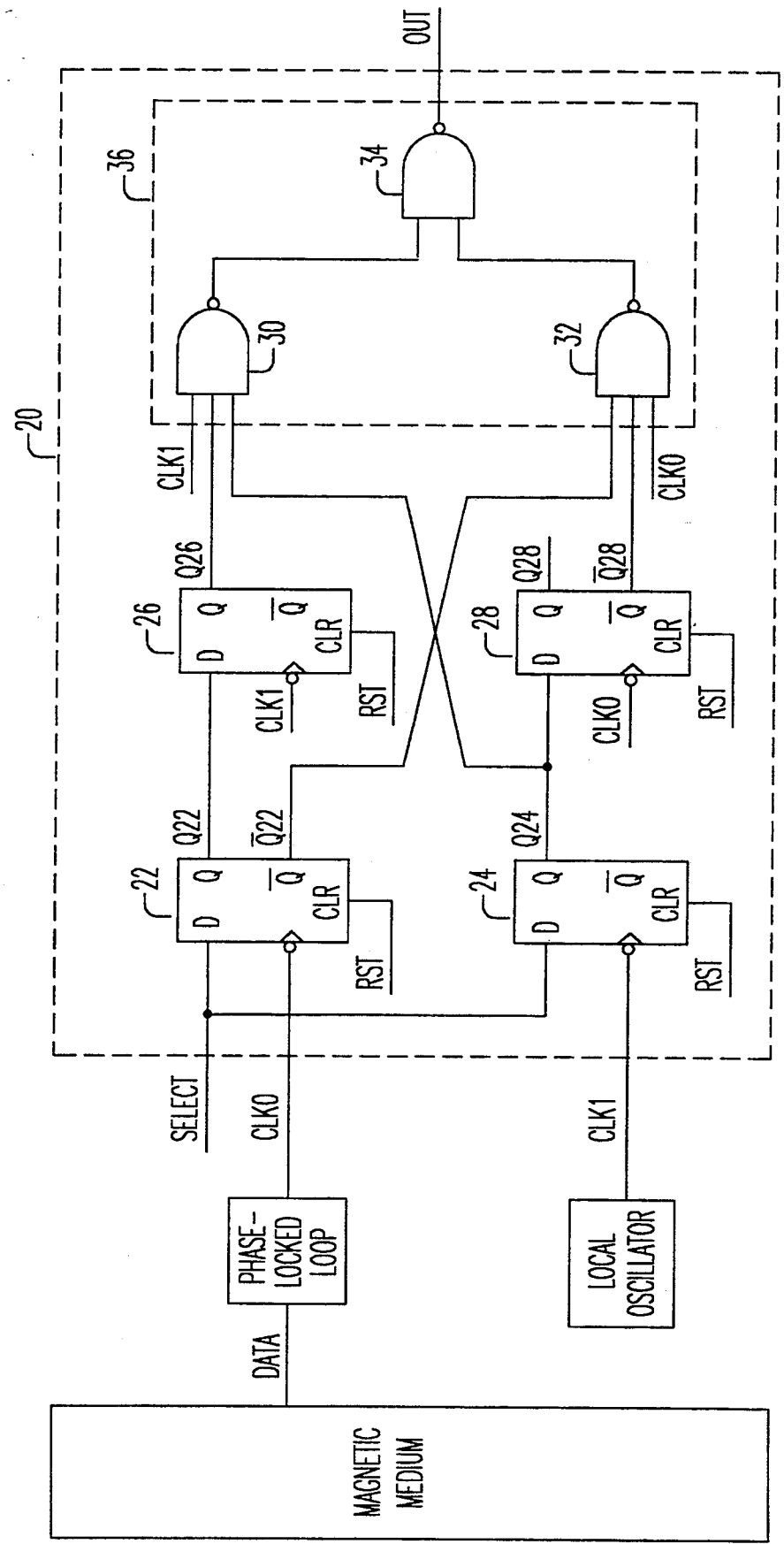
FIG. 1 is a schematic diagram of an embodiment of a glitch-free multiplexer.

Referring to FIG. 1, an embodiment of a glitch-free multiplexer 20 is shown. Flip-flops 22, 24, 26, and 28 function as one stage shift registers, are falling edge triggered, and are preferably D-type flip-flops. Glitch-free multiplexer 20 receives a logic level select input signal that provides the D-input to flip-flops 22 and 24. Flip-flop 22 is clocked by a first clock, CLK0, and provides both an output Q22 and an inverted output $\overline{Q22}$. Flip-flop 24 is clocked by a second clock, CLK1, and provides an output Q24.

Flip-flop 26 receives as the D-input the output Q22 of flip-flop 22 and is clocked by the second clock signal, CLK1. Flip-flop 26 provides an output Q26. Flip-flop 28 receives as the D-input the output Q24 from flip-flop 24 and is clocked by the first clock, CLK0. Flip-flop 28 provides an output Q28 and an inverted output $\overline{Q28}$. Each flip-flop has a reset input such that on power-up each shift register can be cleared to provide a known output.

NAND gates 30, 32, and 34 are configured as a multiplexer 36 to provide one of the inputs to NAND gate 30 or one of the inputs to NAND gate 32 as the output OUT of glitch free multiplexer 20. NAND gate 30 receives as inputs the second clock signal CLK1, the output Q26 from flip-flop 26, and the output Q24 from flip-flop 24. NAND gate 30 provides an output that is low only when all of the inputs are high. NAND gate 32 receives as inputs the first clock signal CLK0, the inverted output $\overline{Q28}$ from flip-flop 28, and the inverted output $\overline{Q22}$ from flip-flop 22. NAND gate 32 provides an output that is low only when all of the inputs are high.

NAND gate 34 receives as inputs the outputs from NAND gates 30 and 32. NAND gate 32 provides an output, OUT, that is the output of glitch-free multiplexer 20. NAND gate 34 provides an output that is low only when both of the inputs are high.

Figure 2:
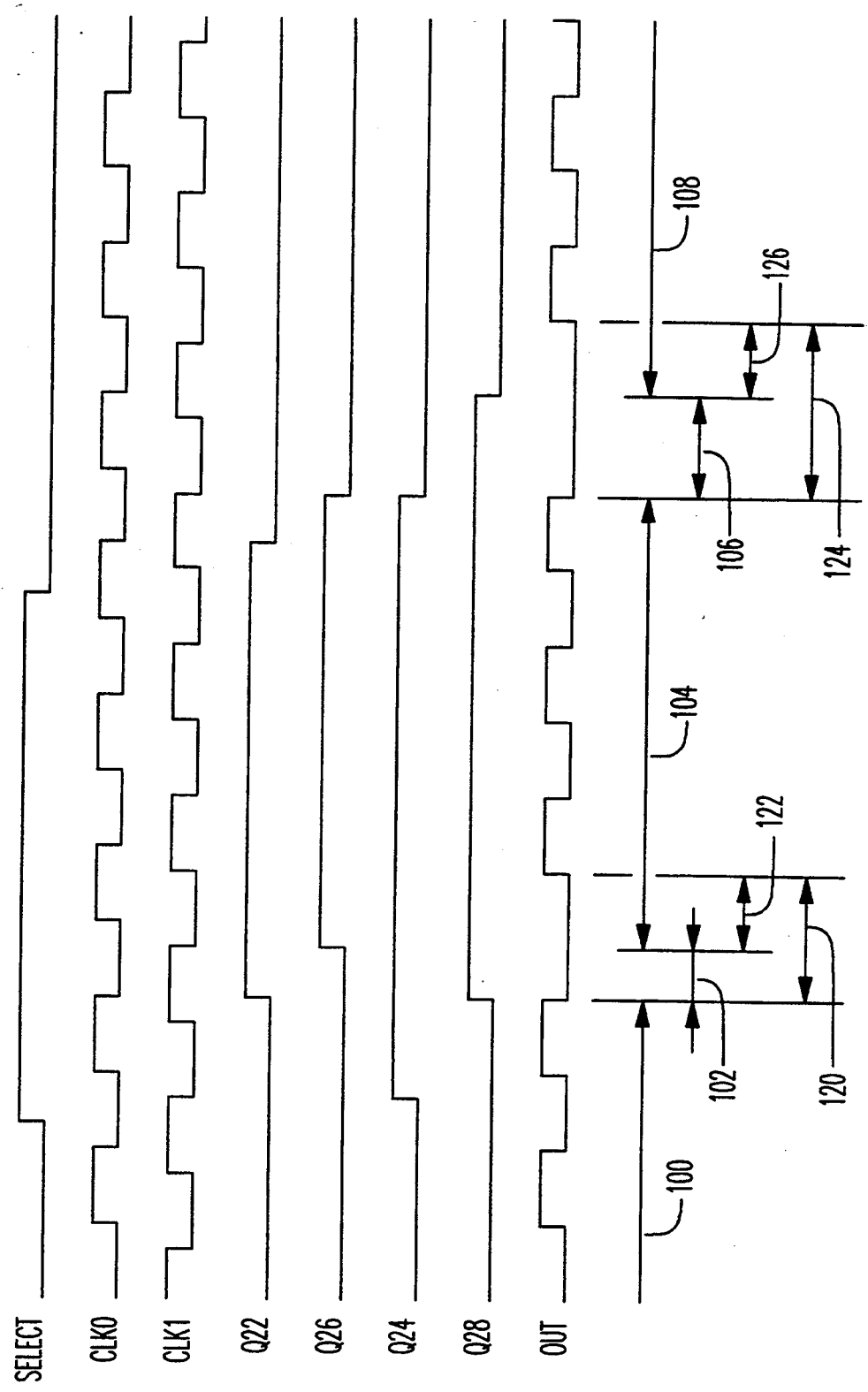
FIG. 2 is a graphical diagram showing timing diagrams for the multiplexer of FIG. 1.

The operation of glitch-free multiplexer 20 is best understood with reference to the schematic diagram of FIG. 1 in conjunction with the timing diagrams of FIG. 2. There are two directions of operation of glitch-free multiplexer 20 in switching from an active clock currently in service to a clock being switched into service. This corresponds to switching from the first clock, CLK0, to the second clock, CLK1, and switching from the second clock, CLK1, to the first clock, CLK0.

With the select input (SELECT in FIGS. 1 and 2) initially low, CLK0 is provided as the output, OUT, of glitch-free multiplexer 20. Flip-flop 22 has latched a zero output Q22 and the zero has propagated to be latched to output Q26 of flip-flop 26. Similarly, flip-flop 24 has latched a zero output Q24 that has propagated to be latched to output Q28. Since $\overline{Q28}$ is the inverse of Q28, $\overline{Q28}$ is a logic 1. The output of NAND gate 30 remains high as both outputs Q26 and Q24 remain low, disabling NAND gate 30 thereby blocking CLK1 from the output of glitch-free multiplexer 20. Output $\overline{Q}22$ of flip-flop 22 and output $\overline{Q}28$ of flip-flop 28 are latched high which permits CLK0 to pass through to the output of NAND gate 32 as an inverted signal, then inverted again by NAND gate 34 to provide CLK0 as the output of multiplexer 20.

The state of the select input transitioning high initiates the switching of multiplexer 20 output from CLK0 to CLK1. Subsequent to the select input changing state, a falling edge may occur first in either CLK0 or CLK1. On the first falling edge of CLK0 subsequent to the select input going high, flip-flop 22 output Q22 is latched high and the output $\overline{Q}22$ is latched low. When output $\overline{Q}22$ transitions low, CLK0 has completed the high portion of its cycle, has transitioned low, and NAND gate 32 is disabled such that CLK0 is blocked from passing through NAND gate 32 to the output of multiplexer 20. The output of NAND gate 32 transitions to and remains high until the inputs change state. Simultaneously, the output of NAND gate 34 transitions to and remains low. The multiplexer output is held low awaiting CLK1 to transition low. The next falling edge of CLK1 latches the output of Q26 high, the high state being shifted to flip-flop 26 from the output Q22 of flip-flop 22. When Q26 goes high, CLK1 has completed the high portion of its cycle, transitioned low, and NAND gate 30 is enabled such that CLK1 passes through NAND gate 30 to be the output of multiplexer 20. The output from multiplexer 20, OUT, along the time axis of FIG. 2 through region 100 is CLK0. The entire duration of the low portion of the CLK1 signal cycle is provided at the output signal, OUT, providing a low state 120, the duration of which is that time(region 102) when the output OUT is held low after CLK0 transitioned low to await CLK 1 to transition low, through the entire low portion(region 122) of the CLK1 signal cycle. When the multiplexer output switches from one clock signal to the other, the switching occurs such that the high portions of CLK0 and CLK1 as provided at the output, OUT, is unchanged.

On the first falling edge of CLK1 subsequent to the select input going high, flip-flop 24 output Q24 is latched high providing a high input to flip-flop 28 and NAND gate 30. The next falling edge of CLK0 latches flip-flop 28 output Q28 high. With the outputs Q24 and Q26 high, NAND gate 30 is enabled such that CLK1 will be passed by NAND gate 30 to provide an inverted CLK1 signal at the output of NAND gate 30 which is inverted again by NAND gate 34 to reproduce CLK1 at the output of multiplexer 20. Along the time axis of FIG. 2, region 102 represents the duration of time the output of multiplexer 20 is held low between when the active clock, CLK0, first transitioned low and when the clock being switched to be the output of multiplexer 20, CLK1, transitioned low.

Multiplexer 20 provides CLK1 as the output until the state of the select input going low initiates the switching of multiplexer output from CLK1 to CLK0 and the switching of the multiplexer output is complete as represented by region 104 in FIG. 2.

The state of the select input transitioning low initiates a change of multiplexer 20 output from CLK1 to CLK0. Subsequent to the select input changing state, a falling edge may occur first in either CLK0 or CLK1. On the first falling edge of CLK1 subsequent to the select input going low, flip-flop 24 output Q24 is latched low, CLK1 has completed the high portion of its cycle, has transitioned low, and NAND gate 30 is disabled such that CLK1 is blocked from passing through NAND gate 30 to the output of multiplexer 20. The output of NAND gate 30 transitions to and remains high until the inputs change state. Simultaneously, the output of NAND gate 34 transitions to and remains low. The multiplexer output is held low awaiting CLK0 to transition low. The next falling edge of CLK0 latches the output of Q28 low, the low state being shifted to flip-flop 28 from output Q24 of flip-flop 24. When Q28 goes low, $\overline{Q}28$ goes high, CLK0 has completed the high portion of its cycle, transitioned low and NAND gate 32 is enabled such that CLK0 passes through NAND gate 32 to be the output of multiplexer 20. The entire duration of the low portion of the CLK0 signal cycle is provided at the output signal, OUT, providing a low state 124, the duration of which is that time(region 106) when the output OUT was held low after CLK1 transitioned low to await CLK0 to transition low, through the entire low portion(region 126) of the CLK0 signal cycle.

On the first falling edge of CLK0 subsequent to the select input going low, flip-flop 22 output Q22 is latched low. Simultaneously, output $\overline{Q}22$ is latched high providing a high input to NAND gate 32. The next falling edge of CLK1 latches flip-flop 26 output Q26 low and simultaneously latches output $\overline{Q}28$ high. With the outputs $\overline{Q}22$ and $\overline{Q}28$ high, CLK0 will be passed by NAND gate 32 to provide an inverted CLK0 signal at the output of NAND gate 32 and be inverted again by NAND gate 34 to reproduce CLK0. Along the time axis of FIG. 2, region 106 represents the duration of time the output of multiplexer 20 is held low between when the active clock, CLK1, first transitioned low and when the clock being switched to be the output of multiplexer 20, CLK0, transitioned low. Thereafter, multiplexer 20 provides CLK0 as the output as represented along the time axis of FIG. 2 by region 108 until the state of the select input is changed and the switching of the multiplexer output is complete.

The crossover input from flip-flop 22 to NAND gate 30 disables the respective NAND gate immediately upon the active clock transitioning low. The flip-flop pairs 22 and 26, and 24 and 28 form shift registers that respectively turn on NAND gates 30 and 32 to assure that switching the output of the multiplexer from one clock to the other does not cause the multiplexer output to change state at the instant of switching.

An application for the glitch-free multiplexer is in a disk read channel where data is written onto a disk using a clock signal generated by a local crystal oscillator. A clock signal is recovered from data read from the disk by a phase-locked loop circuit. The read and write data is transferred to and from a controller that communicates with a computer to further process the data. The invention could be used in a system such as a disk drive or a computer.

As is evident from the timing diagrams of FIG. 2, the output of multiplexer 20 does not switch from an active first clock to a second clock immediately upon the select input changing state. The glitch-free multiplexer waits for the active clock to transition to its low state, disconnects the active clock from the output, holds the output in a low state waiting for the second clock to transition low, and connects the second clock to the output while the second clock is also in a low state. During the time periods represented by regions 102 and 106, the output of the multiplexer is blocked.

While the invention has been described with only two input clock signals, the invention is not so limited. The embodiment of the invention described is implemented using particular logic elements, but the invention is not limited thereto. Furthermore, the invention is not limited to switching the output from a first clock signal to a second clock signal while the second clock signal is in the low portion of its cycle. The switching could occur while the second clock is in the high portion of its cycle which might be implemented using rising edge triggered flip-flops, and the signals being switched need not be clock signals.

I claim:

1. An integrated circuit including a multiplexer for selecting one of at least two clock signals as the output signal, comprising:
   a first shift register for receiving a select input, the first shift register clocked by a first clock signal, said first shift register providing a first shift register output and an inverted first shift register output;
   a second shift register for receiving the select input, the second shift register clocked by a second clock signal, said second shift register providing a second shift register output;
   a third shift register for receiving as an input the first shift register output, said third shift register clocked by the second clock signal, said third shift register providing a third shift register output;
   a fourth shift register for receiving as an input the second shift register output, said fourth shift register clocked by the first clock signal, said fourth shift register providing an inverted fourth shift register output;
   first gate means for receiving as inputs the second clock signal, the third shift register output, and the second shift register output, the first gate means providing a first gate means output that is low when all inputs are in a high state, and is high when at least one input is in a low state;
   second gate means for receiving as inputs the first clock signal, the inverted fourth shift register output, and the first shift register output, the second gate means providing a second gate means output that is low when all inputs are in a high state, and is high when at least one input is in a low state; and
   third gate means for receiving as inputs the first and second gate means outputs, the third gate means providing an output that is low when both inputs are in a high state and high when at least one input is in a low state.

2. An integrated circuit as recited in claim 1, wherein each of the shift registers further comprises a reset input such that on power-up each shift register can be cleared to provide a known output.

3. An integrated circuit as recited in claim 1, wherein one of the first and second clock signals is recovered from data read from a disk.

4. A system including a multiplexer for selecting one of at least two clock signals as the output signal, comprising:
   a magnetic medium;
   a read-write channel to read data from or write data to the magnetic medium, the read-write channel responsive to a first clock signal when writing data to the magnetic medium, the read-write channel recovering a second clock signal from data read from the magnetic medium;
   a first shift register for receiving a select input, the first shift register clocked by the first clock signal, said first shift register providing a first shift register output and an inverted first shift register output;
   a second shift register for receiving the select input, the second shift register clocked by the second clock signal, said shift register providing a second shift register output;
   a third shift register for receiving as an input the first shift register output, said third shift register clocked by the second clock signal, said third shift register providing a third shift register output;
   a fourth shift register for receiving as an input the second shift register output, said fourth shift register clocked by the first clock signal, said fourth shift register providing an inverted fourth shift register output;
   first gate means for receiving as inputs the second clock signal, the third shift register output, and the second shift register output, the first gate means providing a first gate means output that is low when all inputs are in a high state, and is high when at least one input is in a low state;
   second gate means for receiving as inputs the first clock signal, the inverted fourth shift register output, and the first shift register output, the second gate means providing a second gate means output that is low when all inputs are in a high state, and is high when at least one input is in a low state; and
   third gate means for receiving as inputs the first and second gate means outputs, the third gate means providing an output that is low when both inputs are in a high state and high when at least one input is in a low state.

5. A system as recited in claim 4, wherein each of the shift registers further comprises a reset input such that on power-up each shift register can be cleared to provide a known output.

* * * * *